United States Patent
Barclay et al.

(10) Patent No.: US 8,025,720 B2
(45) Date of Patent: Sep. 27, 2011

(54) SYSTEMS AND METHODS FOR PROCESSING METHANE AND OTHER GASES

(75) Inventors: John A. Barclay, Redmond, WA (US); Michael A. Barclay, Berkshire (GB)

(73) Assignee: Prometheus Technologies, LLC, Redmond, WA (US)

( * ) Notice: Subject to any disclaimer, the term of this patent is extended or adjusted under 35 U.S.C. 154(b) by 0 days.

(21) Appl. No.: 12/781,712

(22) Filed: May 17, 2010

(65) Prior Publication Data

US 2010/0224067 A1    Sep. 9, 2010

Related U.S. Application Data

(62) Division of application No. 11/754,135, filed on May 25, 2007, now Pat. No. 7,744,677.

(51) Int. Cl.
B01D 53/04    (2006.01)
(52) U.S. Cl. .................. 96/115; 96/124; 96/125; 96/126
(58) Field of Classification Search ..................... 96/121, 96/124–128, 130, 146; 95/107, 113, 139
See application file for complete search history.

(56) References Cited

U.S. PATENT DOCUMENTS

| | | | | |
|---|---|---|---|---|
| 2,450,289 | A | * | 9/1948 | Marek ............................ 422/120 |
| 3,087,291 | A | * | 4/1963 | Jackson et al. ................... 95/136 |
| 3,164,452 | A | * | 1/1965 | Westeren et al. ................ 95/115 |
| 3,594,983 | A | * | 7/1971 | Yearout ............................. 95/97 |
| 4,332,135 | A | | 6/1982 | Barclay et al. |
| 4,408,463 | A | | 10/1983 | Barclay |
| 4,425,142 | A | * | 1/1984 | Mann .............................. 95/106 |
| 4,444,727 | A | * | 4/1984 | Yanagihara et al. .......... 422/223 |
| 4,459,811 | A | | 7/1984 | Barclay et al. |
| 4,462,814 | A | | 7/1984 | Holmes et al. |
| 4,507,927 | A | | 4/1985 | Barclay |
| 4,533,372 | A | | 8/1985 | Valencia et al. |
| 4,553,566 | A | | 11/1985 | Barclay et al. |
| 4,582,516 | A | * | 4/1986 | Kadi ................................ 96/146 |
| 4,642,994 | A | | 2/1987 | Barclay et al. |
| 4,696,681 | A | * | 9/1987 | Lloyd-Williams .............. 95/115 |
| 4,702,090 | A | | 10/1987 | Barclay et al. |
| 4,704,871 | A | | 11/1987 | Barclay et al. |
| 4,881,958 | A | * | 11/1989 | Eckardt et al. .................. 96/127 |
| 4,923,493 | A | | 5/1990 | Valencia et al. |

(Continued)

OTHER PUBLICATIONS

Haselden, G.G., "Gas Separation Fundamentals," "Gas Separation & Purification," Dec. 1989, pp. 209-215, vol. 3, Butterworth & Co. Ltd.

(Continued)

Primary Examiner — Frank Lawrence, Jr.
(74) Attorney, Agent, or Firm — Perkins Coie LLP

(57) ABSTRACT

Systems and methods for processing methane and other gases are disclosed. A representative method in accordance with one embodiment includes directing a first portion of a gas stream through a first adsorbent while exchanging heat between a second adsorbent and a third adsorbent. The method can further include directing a second portion of the gas stream through the third adsorbent while exchanging heat between the first and second adsorbents. The method can still further include directing a third portion of the gas stream through the second adsorbent while exchanging heat between the first and third adsorbents. In further particular aspects, the adsorbent can be used to remove carbon dioxide from a flow of methane. In other particular aspects, a heat exchange fluid that is not in direct contact with the adsorbents is used to transfer heat among the adsorbents.

20 Claims, 8 Drawing Sheets

U.S. PATENT DOCUMENTS

| | | | |
|---|---|---|---|
| 4,956,976 | A | 9/1990 | Kral et al. |
| 5,096,469 | A | 3/1992 | Keefer et al. |
| 5,120,338 | A | 6/1992 | Potts, Jr. et al. |
| 5,182,914 | A | 2/1993 | Barclay et al. |
| 5,213,593 | A * | 5/1993 | White, Jr. .......................... 95/99 |
| 5,298,054 | A * | 3/1994 | Malik .............................. 95/99 |
| 5,487,775 | A | 1/1996 | LaCava et al. |
| 5,505,232 | A | 4/1996 | Barclay et al. |
| 5,658,369 | A * | 8/1997 | Kusay .............................. 95/41 |
| 6,066,192 | A * | 5/2000 | Toshinaga et al. ................ 95/93 |
| 6,082,133 | A | 7/2000 | Barclay et al. |
| 6,261,345 | B1 * | 7/2001 | Miyano et al. .................... 95/96 |
| 6,332,323 | B1 | 12/2001 | Reid et al. |
| 6,467,274 | B2 | 10/2002 | Barclay et al. |
| 6,630,012 | B2 | 10/2003 | Wegeng et al. |
| 6,758,046 | B1 | 7/2004 | Barclay et al. |
| 7,022,159 | B2 * | 4/2006 | Kalbassi et al. .................. 95/99 |
| 7,326,278 | B2 * | 2/2008 | Butters et al. .................... 95/114 |
| 2003/0037672 | A1 * | 2/2003 | Sircar .............................. 95/96 |
| 2003/0089125 | A1 | 5/2003 | Fredheim et al. |

OTHER PUBLICATIONS

Krauskopf et al., "Introduction to Geochemistry," 1995, pp. 142-145, McGraw-Hill, Inc.

Younger, Dr. A.H., "Natural Gas Processing Principles and Technology", Apr. 2004, Part I, Section 7.11, pp. 7/61-7/64 Thimm Engineering, Calgary, Alberta, Canada.

Younger, Dr. A.H., "Natural Gas Processing Principles and Technology", Apr. 2004, Part II, Section 17.3, pp. 17/4-17/6 Thimm Engineering, Calgary, Alberta, Canada.

Agrawal et al., "Prodcution of Medium Pressure Nitrogen by Cryogenic Air Separation," Dec. 1991, pp. 203-209, vol. 5, Butterworth-Heinemann Ltd.

Beysel, Dr. Gerhard, "Air Separation Plants Using Cryogenic, PSA or Membrane Technology: Development and Future Applications," International Institute of Refrigeration, Proceedings of Commission A3, Oct. 1986, pp. 65-75.

"Gas Processors Suppliers Association: Engineering Data Book (Revised Tenth Edition)" 1994, Section 25.

Holmes et al., Pilot Tests Prove Ryan/Holmes Cryogenic Acid Gas/Hydrocarbon Separations, Gas Processors Association Annual Convention Proceedings, 1982, pp. 75-85.

Ryan et al., "Distillation Technology Increases Propane Recovery in Carbon-Dioxide Floods," Oil and Gas Journal, Oct. 6, 1986, pp. 62-67.

Gemmingen, Ulrich V., "Pressure Swing Adsorption Process-Design and Simulation," Fundamentals of Adsorption, Proceedings of the Fourth International Conference on Fundamentals of Adsorption, May 17-22, 1992, pp. 703-712.

Wheless et al., "Trash is Your Friend: Using Landfill Gas as a Vehicle Fuel," Natural Gas Fuels, May 1996, pp. 31-36.

Deschamps et al., "Development of Gaseous Permeation Membranes Adapted to the Purification of Hydrocarbons," International Institute of Refrigeration, Proceedings of Commission A3, Oct. 1989, pp. 39-50.

Rautenbach et al., "Upgrading of Landfill Gas by Membranes-Process Design and Cost Evaluation," AIChE Symposium Series: Membrane Separations in Chemical Engineering, 1989, pp. 48-54, Issue 272, vol. 85.

Barclay et al., "Purification Techniques for Natural Gas Refueling Stations," Proceedings of the 14th Natural Gas Vehicle Conference and Exhibition, Sep. 15-17, 1996, pp. 1-12.

Yang, Ralph T., Gas Separation by Adsorption Processes. Imperial College Press, London, 1997 Edition, pp. 1-235.

Kohl, Arther and Nielsen, Richard. Gas Purification. 5th Edition, Gulf Publishing Co., Houston, TX (1997) pp. 1022-1135.

Schmidt, F.W. and Wilmot, A.J. Thermal Energy Storage and Regeneration; (Hemisphere Press, WA; 1981) pp. 279-300 and 333-349.

Ashare, E.; Augenstein, D.C.; Yeung, J.C.; Hossan, R.J.; and Duret, G.L. "Evaluation of Systems for Purification of Fuel Gas from Anaerobic Digestion", Report of DOE contract EY-76-F-02-2991, 1978, pp. 7-31.

Keller, A.P. "Trace Constituents in Landfill Gas: Task Report on Inventory and Assessment of Cleaning Technologies", Gas Research Institute Final Report and Contract No. 5083-253-0937, Apr. 1988, pp. 14-25.

Krich, Ken; Augenstein, Don; Batmale, John; Rutledge, Brad; Salour, Dara. Biomethane from Dairy Waste: A Sourcebook for the Production and Use of Renewable Natural Gas in California. Jul. 2005, pp. 47-69.

* cited by examiner

194

195

DIRECT A PROCESS GAS STREAM ALONG A PROCESS FLOW PATH THROUGH A FIRST ADSORBENT WHILE DIRECTING A HEAT EXCHANGE FLUID ALONG A HEAT EXCHANGER FLOW PATH TO EXCHANGE HEAT BETWEEN A SECOND ADSORBENT AND A THIRD ADSORBENT, THE HEAT EXCHANGER FLOW PATH AND THE PROCESS GAS FLOW PATH BEING IN FLUID ISOLATION FROM EACH OTHER

196

DIRECT PROCESS GAS ALONG THE PROCESS GAS FLOW PATH THROUGH THE THIRD ADSORBENT WHILE DIRECTING THE HEAT EXCHANGE FLUID ALONG THE HEAT EXCHANGER FLOW PATH TO EXCHANGE HEAT BETWEEN THE FIRST ADSORBENT AND THE SECOND ADSORBENT; AND

197

DIRECT PROCESS GAS ALONG THE PROCESS GAS FLOW PATH THROUGH THE SECOND ADSORBENT WHILE DIRECTING THE HEAT EXCHANGE FLUID ALONG THE HEAT EXCHANGER FLOW PATH TO EXCHANGE HEAT BETWEEN THE FIRST ADSORBENT AND THE THIRD ADSORBENT.

*Fig. 5*

SYSTEMS AND METHODS FOR PROCESSING METHANE AND OTHER GASES

CROSS-REFERENCE TO PRIOR APPLICATIONS

This application is a divisional application of U.S. patent application Ser. No. 11/754,135 now U.S. Pat. No. 7,744,677, filed May 25, 2007, which is incorporated herein by reference.

TECHNICAL FIELD

Aspects of the present disclosure are directed to systems and methods for processing methane and other gases, including systems and methods for removing carbon dioxide and/or other impurities from a process stream containing methane gas.

BACKGROUND

Global warming and climate change are presently receiving significant scientific, business, regulatory, political, and media attention. According to increasing numbers of independent scientific reports, greenhouse gases impact the ozone layer and the complex atmospheric processes that re-radiate thermal energy into space, which in turn leads to global warming on Earth. Warmer temperatures in turn affect the entire ecosystem via numerous complex interactions that are not always well understood. Greenhouse gases include carbon dioxide, but also include other gases such as methane, which is about 23 times more potent than carbon dioxide as a greenhouse gas, and nitrous oxide, which is over 300 times more potent than carbon dioxide as a greenhouse gas.

In addition to the foregoing greenhouse gas concerns, there are significant concerns about the rate at which oil reserves are being depleted and that the United States imports over 60% of the crude oil it consumes from a few unstable regions of the globe. Accordingly, there is an increasing focus on finding alternative sources of energy, including clean, renewable, less expensive, and domestic energy sources. These sources include municipal solid waste, food processing wastes, animal wastes, restaurant wastes, agricultural wastes, and waste water treatment plant sludge. These sources also include coal seam methane, coal mine gas, and stranded well gas.

Many of the foregoing organic waste streams can be converted to biogas via anaerobic bacteria to produce mixtures of methane. Examples include covered landfills where the landfill gas contains approximately 48% methane, 38% carbon dioxide, 12% nitrogen and oxygen, water vapor, and small amounts of numerous other compounds. Biogas from anaerobic digestion of organic waste streams consists of approximately 65% methane, 33% carbon dioxide, water vapor and small amounts of other compounds. Coal mine gas contains approximately 64% methane, 32% nitrogen, 3% carbon dioxide, water, and small amounts of other compounds. Stranded well gas has a wide range of compositions depending on the location but typically contains approximately 80% methane, 13% nitrogen, several percent ethane and propane, plus water and 2% carbon dioxide. These stranded or waste sources of methane are widely geographically distributed rather than in large, localized sources like a large gas field. With enhanced technology these distributed methane sources are being converted to compressed natural gas (CNG) or liquid natural gas (LNG) and used as low emissions vehicle fuel for light and heavy duty vehicles.

The processes associated with producing both LNG and CNG include purifying the incoming methane gas stream to remove, among other constituents such as those that freeze out in or otherwise degrade LNG process equipment, constituents that contribute to an increase in emitted greenhouse gases. For example, the carbon dioxide present in the methane mixtures from most of the distributed waste or stranded sources must be efficiently removed to a concentration of about 100 parts per million to avoid freezing out in LNG. The small, distributed nature of many biomass waste streams or stranded gas wells or landfills makes the capital and operating costs associated with a waste-to-energy plant a key component in the price of the LNG or CNG vehicle fuel. Accordingly, there is a need for, better purifier and liquefier technology that reduces capital and operating costs and results in a more competitively priced methane fuel.

BRIEF DESCRIPTION OF THE DRAWINGS

FIG. 5 is a flow diagram illustrating a process for exchanging heat between adsorbents in accordance with an embodiment of the invention.

DETAILED DESCRIPTION

Figure 1:
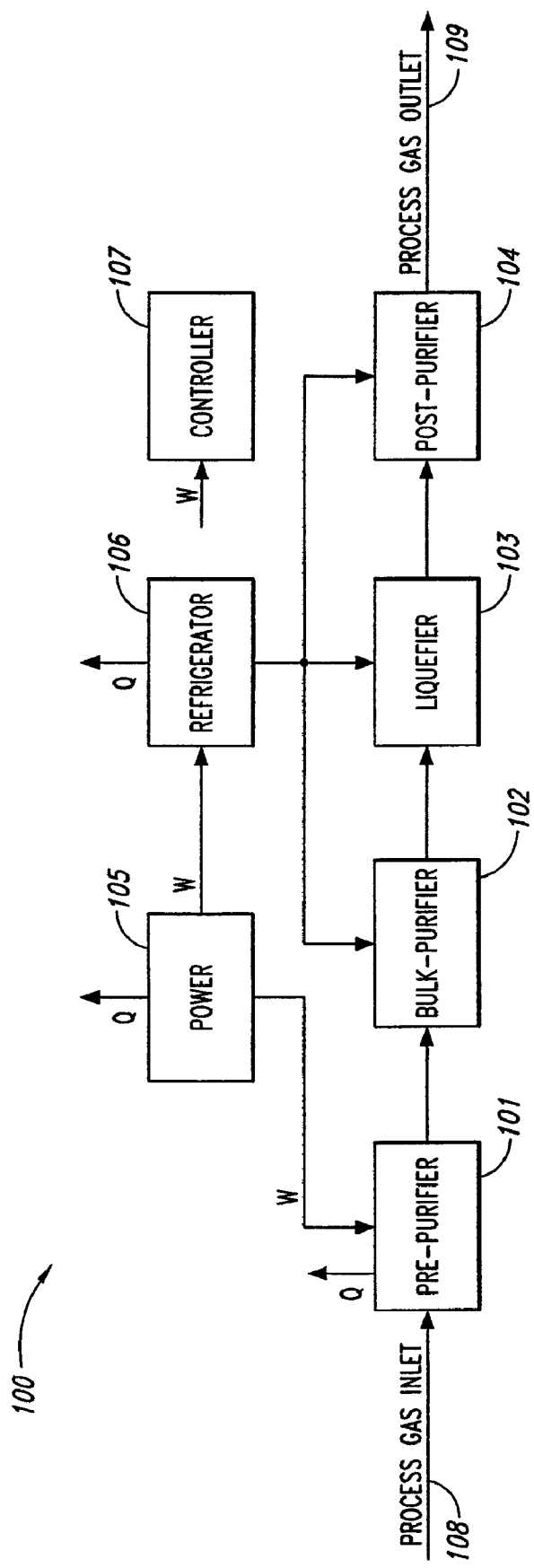
FIG. 1 is a schematic block diagram illustrating an overall processing system configured in accordance with an embodiment of the invention.

Several aspects of the present disclosure are directed to systems and methods for processing methane and other gases. Well-known characteristics often associated with these systems and methods have not been shown or described in detail to avoid unnecessarily obscuring the description of the various embodiments. Those of ordinary skill in the relevant art will understand that additional embodiments may be practiced without several of the details described below, and that other embodiments may include aspects in addition to those described below.

Several methods in accordance with embodiments of the disclosure are directed to techniques for extracting contaminants from a flow of process gas, for example, extracting carbon dioxide from a flow of methane. In many of these embodiments, a series of three adsorbent beds or other volumes of adsorbent are used to conduct a rapid temperature swing adsorption process that extracts the carbon dioxide or other impurity. For example, one such method includes directing a first portion of a gas stream through a first adsorbent while exchanging heat between a second (e.g., saturated) adsorbent and a third (e.g., cleaned) adsorbent. Accordingly, the first adsorbent can remove impurities from the process gas stream, while the second adsorbent is purged of impurities while the third adsorbent is cooled. The process can then cycle among the three adsorbents so that each one sequentially removes contaminant, is then heated to purge the contaminants, and is then cooled in preparation to repeat the cycle. Accordingly, the method can further include subsequently directing a second portion of the process gas stream through the third adsorbent while heat is exchanged between the first and the second adsorbent, e.g., using a separate heat exchange fluid. In particular embodiments, the first saturated adsorbent is purged of impurities once it is hot and the second adsorbent is ready for use after it is cooled. The method can still further include directing a third portion of the process gas stream through the second adsorbent while exchanging heat between the first adsorbent and the third adsorbent, e.g., using a separate heat exchange fluid to couple the first and third adsorbents. By exchanging heat between the adsorbents to purge a saturated adsorbent and cool a purged adsorbent, embodiments of the system are expected to be more efficient than current temperature swing adsorption techniques. For example, such embodiments can retain most of the substantial sensible heat difference between the hot and cool adsorbents instead of exhausting the sensible heat used to head an adsorbent hot when the adsorbent is subsequently cooled. Embodiments of the system (e.g., embodiments that exchange heat between hot and cool adsorbents via a separate heat exchange fluid distinct from the process gas stream) are also expected to increase the purifying capacity of the adsorbent per unit time. These features can reduce capital cost and operating cost in distributed-scale purifier systems, including those that produce purified methane process streams at a relatively low flow rate, for example, at a rate of from about 1 million standard cubic feet per day (1 MMscfd), as typically found at distributed sources of methane mixtures, such as landfill gas at an average sized landfill.

An overall system in accordance with a particular embodiment is described below with reference to FIG. 1, and arrangements for exchanging heat between adsorbent beds are then described with reference to FIGS. 2-4E. FIGS. 5-8 illustrate particular embodiments of heat exchanger systems for exchanging heat between adsorbent beds. Several embodiments of the disclosure are described below with reference to a methane purification/liquefaction system, and in particular, a process for extracting carbon dioxide from an input stream of a gaseous methane mixture. In other embodiments, generally similar systems and methods can be used to extract other contaminants or constituents from process gas streams including, but not limited to methane.

FIG. 1 is a schematic illustration of a representative system 100 for purifying and liquefying a stream of process gas. The illustrated system 100 includes a process gas inlet 108 at which an input stream of gas is received, and an outlet 109 at which a liquefied product is provided. For example, the inlet 108 can receive a low pressure biogas methane mixture from an agricultural waste anaerobic digester, municipal waste anaerobic digester, landfill, or other source, and the outlet 109 can deliver purified, liquefied natural gas for use in vehicles or other applications. Between the inlet 108 and the outlet 109, the system 100 can include a pre-purifier 101, a bulk purifier 102, a liquefier 103 driven by a refrigerator 106, and a post-purifier 104. In other embodiments used for methane sources such as stranded gas wells or coal mine gas, the system 100 can include more or fewer modules. In any of these embodiments, a power source 105 can provide work/power (indicated by arrow W) to operate the modules of the system 100. Several of the foregoing modules release heat (indicated by arrows Q) which can either be discharged from the system 100, or used by other components of the system 100, as will be described in greater detail later. A controller 107 controls the operation of the modules, with or without intervention by a human operator, depending on the phase of operation.

Figure 2:
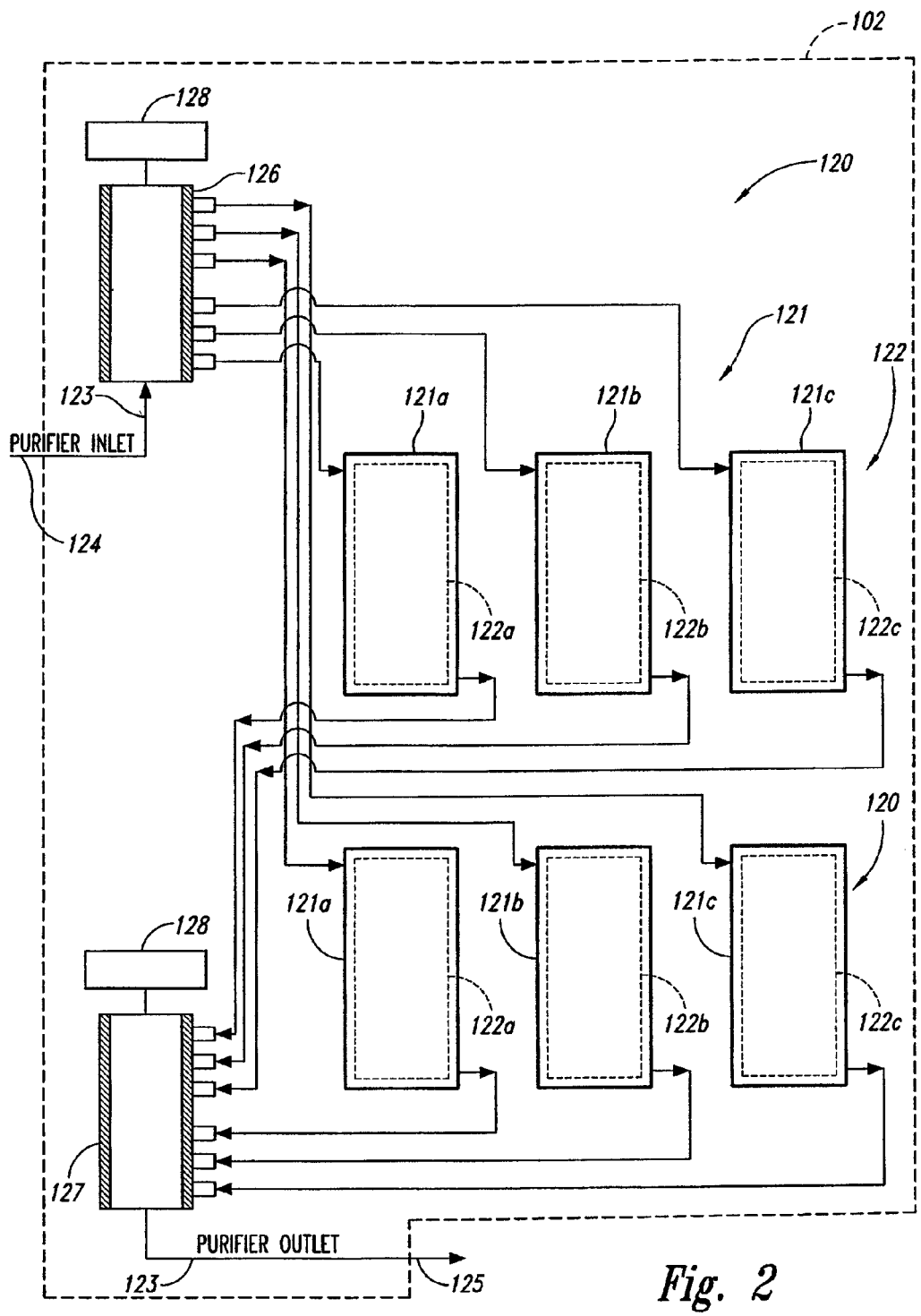
FIG. 2 is a schematic block diagram illustrating a purification portion of the system shown in FIG. 1, configured in accordance with an embodiment of the invention.

FIG. 2 is a schematic illustration of the bulk purifier 102 as configured in accordance with a particular embodiment. The bulk purifier 102 is configured to remove particular constituents (e.g., contaminants) from the process gas via a series of adsorbent beds. In a particular aspect of this embodiment, the bulk purifier 102 includes one or more sets 120 of adsorbent beds. In the illustrated embodiment, the bulk purifier 102 includes two sets 120, and in other embodiments, the bulk purifier 102 can include more or fewer sets 120. Each set 120 can include three volumes or beds of adsorbent 122, shown as a first adsorbent 122a, a second adsorbent 122b, and a third adsorbent 122c. Each adsorbent 122 can be housed in a corresponding vessel 121, shown as a first vessel 121a, a second vessel 121b, and a third vessel 121c. When the bulk purifier 102 includes multiple sets 120, as is shown in FIG. 2, the corresponding first, second, and third vessels 121a-121c of each set can operate in parallel. That is, the first vessels 121a in both sets 120 can perform the same function of a temperature swing adsorption cycle at the same time, while the second vessels 121b of each set 120 are performing a different function of a temperature swing adsorption cycle at the same time, and while the third vessels 121c of each set 120 are performing yet a third function of a temperature swing adsorption cycle at the same time. The adsorbent 122 in each of the vessels 121 is generally identical, or may include identical layers of several adsorbents, though in some embodiments, the adsorbent 122 may vary from one vessel 121 to another.

The bulk purifier 102 can include a process gas inlet valve 126 that receives process gas at a purifier inlet 124, and sequentially directs the process gas among the vessels 121. The process gas inlet valve 126 can include a rotary control valve having one inlet port and multiple outlet ports, e.g., six ports, one corresponding to each of the vessels 121. The process gas inlet valve 126 is driven by an actuator such as a motor 128 under the control of the controller 107 (FIG. 1).

The process gas proceeds along a process gas path 123 that separates into multiple path segments sequentially directed into each of the vessels 121, as indicated in FIG. 2. A process gas outlet valve 127 collects the purified process gas from the vessels 121, and sequentially directs the process gas through a purifier outlet 125. The process gas outlet valve 127 can also include a rotary valve, driven by a corresponding motor 128 or other controllable actuator.

In a particular embodiment, the purified process gas can optionally be close to its liquefaction temperature at the outlet valve 127. For example, the process gas can be near its liquefaction temperature if the adsorbent 122 is adequately cooled, and/or the process gas is pressurized. In a particular example, the adsorbent 122 can be cooled to cryogenic temperatures (e.g., about −150° F.) and/or the process gas can be pressurized to 350-400 psia, 1000 psia, or higher. This arrangement can reduce the cooling load on the refrigerator 106 (FIG. 1). Low temperatures can also improve the effectiveness or adsorptivity of the adsorbent 122.

In a particular embodiment, the six vessels 121 and associated components can be housed in a relatively compact volume. For example, when sized for process gas flow rates of about 1 MMscfd with a carbon dioxide concentration of about 35%, the bulk purifier 102 can be housed in an ISO container having dimensions of 8 ft. wide, 9.5 ft. high and 40 ft. long. In other embodiments, the bulk purifier 102 can have other dimensions.

Figure 3:
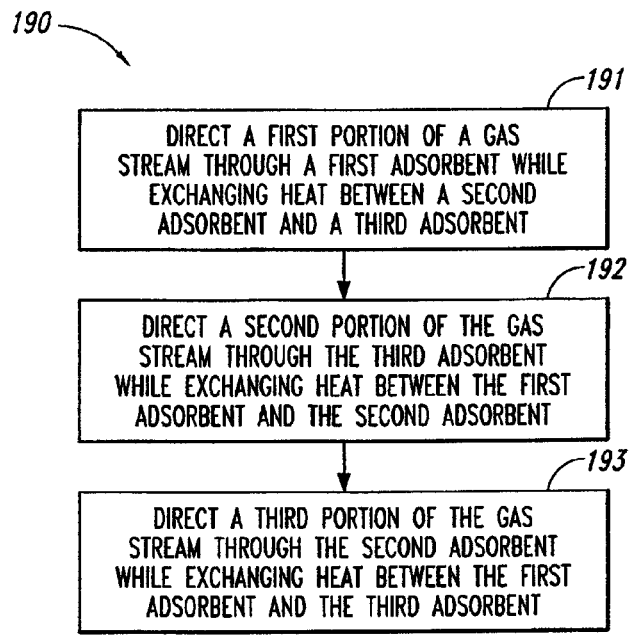
FIG. 3 is a flow diagram illustrating a process for handling a gas stream in accordance with an embodiment of the invention.

FIG. 3 is a flow diagram illustrating a representative method 190 for handling the process gas in accordance with an embodiment of the invention, using embodiments of the bulk purifier 102 described above with reference to FIG. 2. The method 190 can include directing a first portion of a gas stream through a first adsorbent while exchanging heat between a second adsorbent and a third adsorbent, e.g., with a separate heat exchange medium (method portion 191). The method 190 can further include sequentially directing a second portion of the gas stream through the third adsorbent while exchanging heat between the first and second adsorbents, e.g., with the separate heat exchange medium (method portion 192). The method 190 can still further include sequentially directing a third portion of the gas stream through the second adsorbent while exchanging heat between the first and third adsorbents, e.g., with the separate heat exchange medium (method portion 193). Accordingly, one of the three adsorbents can extract impurities from the process gas stream, while the other two adsorbents exchange heat via a separate heat exchange medium in a manner that cools one of the two adsorbents and purges the other of contaminants received from the process gas during a prior portion of the cycle. The individual steps of a representative cycle in accordance with a particular embodiment are described in further detail below with reference to FIGS. 4A-4E.

Figure 4A:
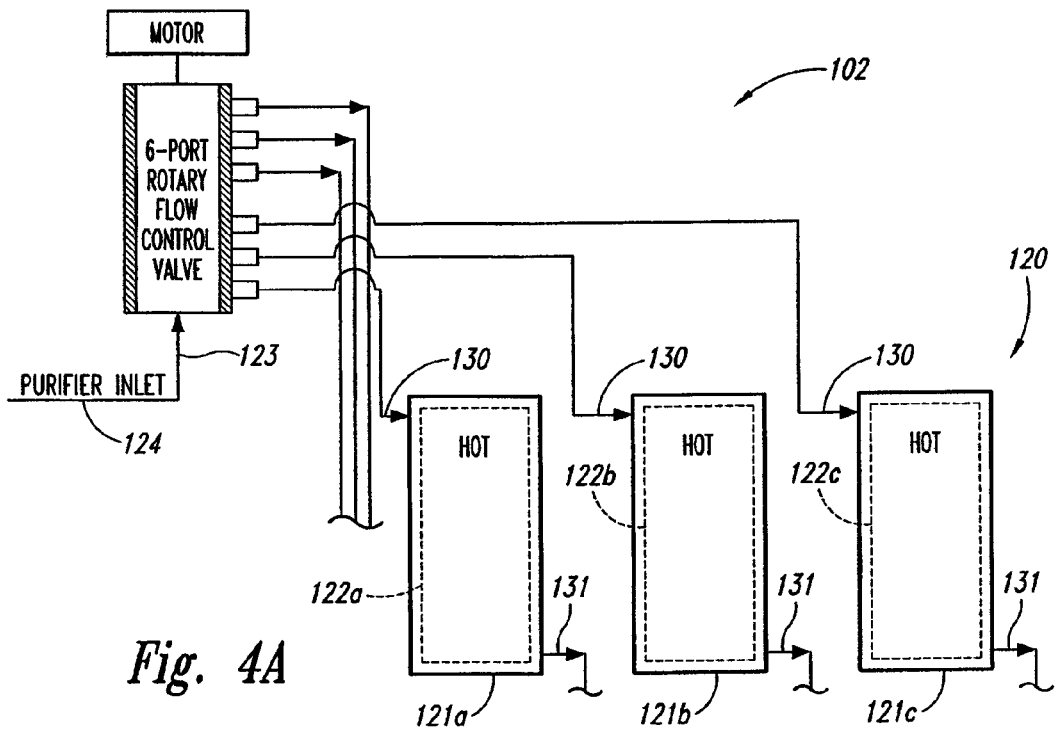
FIGS. 4A-4E are schematic illustrations of a portion of the system shown in FIG. 2 during several phases of operation in accordance with an embodiment of the invention.

FIG. 4A illustrates a portion of the bulk purifier 102 shown in FIG. 2. For purposes of illustration, only one of the two sets 120 is shown in FIG. 4A and in related FIGS. 4B-4E. It will be understood by one of ordinary skill in the relevant art that multiple sets 120 can be operated in a parallel manner to increase the capacity of the overall bulk purifier 102, and/or to reduce the volume of gas processed by each of the vessels 121a-121c.

Each of the vessels 121a-121c includes a process gas inlet 130 and a process gas outlet 131, with the corresponding adsorbent 122a-122c positioned along the process gas flow path 123 between the process gas inlet 130 and the process gas outlet 131. The adsorbent 122 can include any suitable material selected to remove a particular constituent from the process gas. For example, when the process gas includes methane and the constituent to be removed includes carbon dioxide, the adsorbent 122 can include a natural or synthetic zeolite selected for high carbon dioxide adsorption and very low methane adsorption. Other suitable adsorbents include crystalline molecular sieves, activated carbons, activated clays, silica gels and activated aluminas. Molecular sieves include any of a variety of forms of silico-alumina phosphates and alumina phosphates that are typically agglomerated with a binder to provide the physical properties required for cyclic operation.

At the outset of a purification process, each of the adsorbents 122a-122c is heated, for example, to a temperature of about 500° F. At this temperature, the adsorptivity of most components on the adsorbents is small and residual impurities are typically driven from the adsorbent, leaving the adsorbent "empty" and available for removing contaminants from the process gas. Two of the adsorbents are then cooled, for example, to approximately room temperature or as low as to cryogenic temperatures such as about −150° F. One of the cooled adsorbents is used to remove contaminants from the process gas, and the other is held in reserve for use when the first adsorbent is "full" of contaminant, as described below with reference to FIGS. 4B-4C.

Figure 4B:
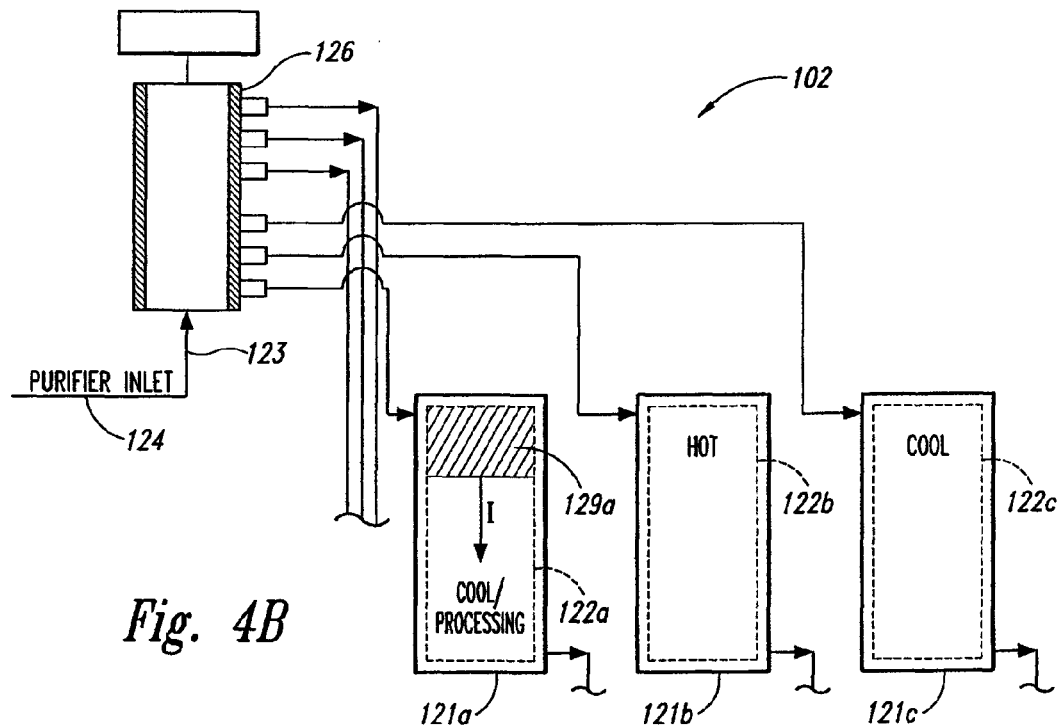

Referring now to FIG. 4B, the first adsorbent 122a and the third adsorbent 122c have been cooled. The process gas inlet valve 126 has been adjusted to direct the process gas flow into the first vessel 121a. As the process gas passes through the first vessel 121a, the first adsorbent 122a begins to adsorb contaminants from the process gas, resulting in a volume of filled adsorbent 129a that increases from the top down, as indicated schematically by arrow I. The process gas is directed into the first vessel 121a until the first adsorbent 122a is "full." As used herein, a "full" condition refers to a condition when a selected amount of the adsorbent (e.g., 85% or higher) becomes filled or saturated with contaminant, and/or the adsorbent is ready to be regenerated by heating and purging.

Figure 4C:
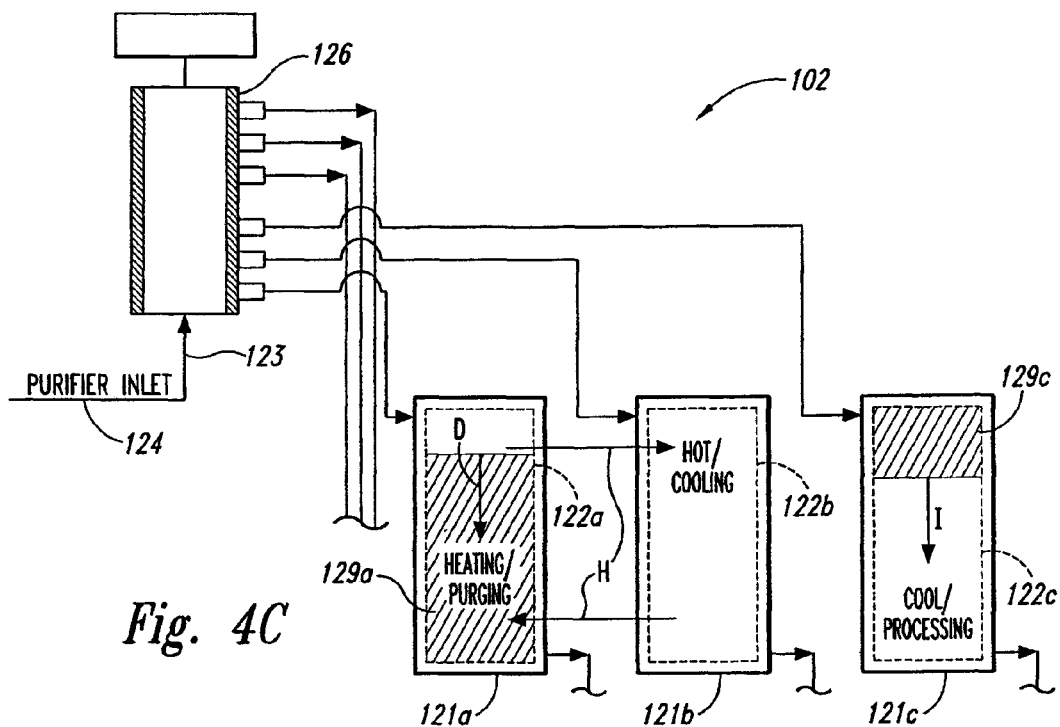

Referring next to FIG. 4C, when the first adsorbent 122a is filled, the process gas inlet valve 126 is adjusted to direct the process gas into the third vessel 121c to contact the third adsorbent 122c. As the process gas passes through the third vessel 121c, an increasing amount of the third adsorbent 122c becomes filled, resulting in an increasing volume of filled adsorbent 129c, indicated by arrow I.

While the third vessel 121c is removing contaminants from the process gas, the first vessel 121a and the second vessel 121b exchange heat (e.g., via a separate heat exchange fluid), as indicated by arrows H. In particular, the first adsorbent 122a receives heat from the second adsorbent 122b so as to heat the first adsorbent 122a. Heating the first adsorbent 122a reduces its adsorptivity for the contaminants so as to easily purge (e.g., partially or completely remove) the adsorbed contaminants from the first adsorbent 122a, while the second adsorbent 122b is cooled in preparation for receiving the next segment of process flow gas. Accordingly, the amount of saturated or filled adsorbent 129a in the first vessel 121a decreases, as indicated by arrow D. At the conclusion of this phase of the process, the entire adsorbent 129a is hot and the amount of filled adsorbent 129a in the first vessel 121a is reduced or eliminated. For example, in a particular embodiment, about 98% or more of the filled adsorbent 129a is purged. A relatively small amount of purified process gas can be directed into the first vessel 121a to maintain the purged condition of the first adsorbent 122a. This purge gas can carry the contaminants to a local flare or other disposal device. The amount of filled adsorbent 129c in the third vessel 121c is increased, e.g., to its desired capacity, and the second adsorbent 122b is cooled by transferring its thermal energy into the first adsorbent 122a and is ready to receive process gas.

Figure 4D:
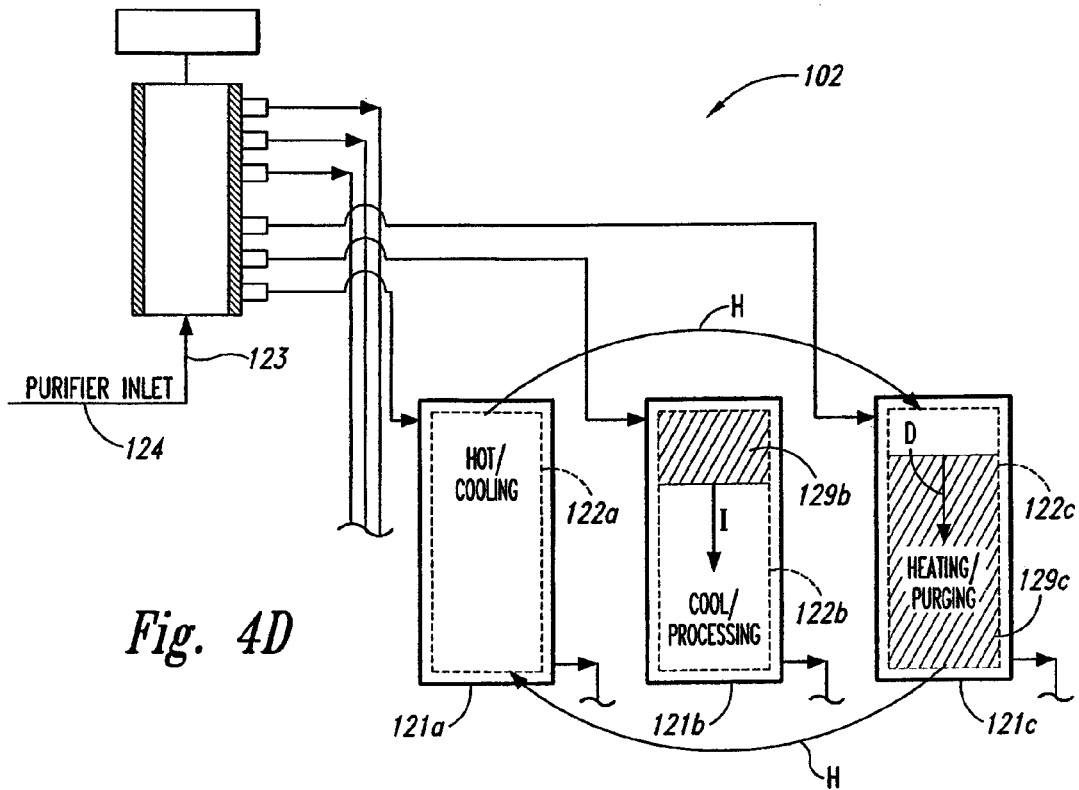

FIG. 4D illustrates the bulk purifier 102 in the next phase of the cycle. In this phase, the process gas inlet valve 126 directs the process gas to the second vessel 121b, increasing the amount of filled adsorbent 129b in the second vessel 121b, as indicated by arrow I. The first and third adsorbents 122a, 122c exchange heat in a manner that cools the first adsorbent 122a and heats the third adsorbent 122c for purging the adsorbed contaminants from the third adsorbent 122c. Accordingly, the amount of filled adsorbent 129c in the third vessel 121c decreases, as indicated by arrow D. At the conclusion of this phase of the process, the second adsorbent 122b is filled or saturated, the third adsorbent 122c is hot and purged, and the first adsorbent 122a is clean and cooled and available to receive more process gas.

Figure 4E:
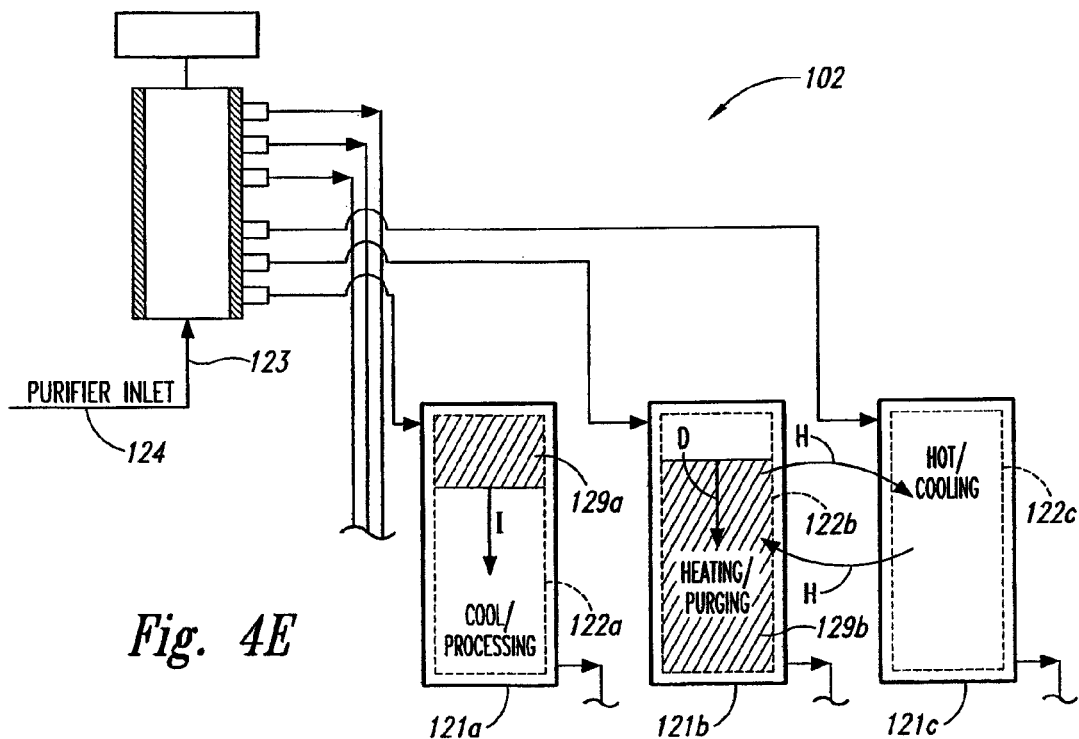

FIG. 4E illustrates the next phase of the process, in which the process gas is directed into the first vessel 121a, and thermal energy is exchanged between the third adsorbent 122c and the second adsorbent 122b. Accordingly, the second adsorbent 122b is hot and purged and the third adsorbent 122c is cooled. At the conclusion of this phase, the vessels 121a-121c are in at least approximately the same state as is shown in FIG. 4B. The processes shown in FIGS. 4C-4E are then repeated in sequence to provide a continuous or nearly continuous flow of purified process gas.

One feature of several embodiments of the overall process described above is that the heat used to purge one adsorbent is received from another adsorbent, which cools the other adsorbent to a temperature sufficient for processing the next portion of process gas. An advantage of this arrangement is that, unlike existing arrangements, it reuses the heat required to purge individual adsorbent volumes. In particular, heat can be passed back and forth among the adsorbents as required to purge contaminants from one adsorbent while cooling another. Due to the presence of the contaminant in the saturated or filled adsorbent, the heat of adsorption on to the adsorbent, the heat of desorption of the contaminant from the adsorbent in the respective vessels, and due to entropy creation during the heat exchange, the heat transfer process is not perfect, and the heat required for heating and purging or recharging the adsorbent will typically be supplemented as the process continues. Further details of this provision are discussed below with reference to FIG. 6. Despite supplemental heating, the foregoing process is expected to be more efficient than existing regeneration processes, which typically burn process gas to heat the adsorbent and purge the contaminants from the adsorbent, or use dedicated heat sources to heat and purge the adsorbent, and then discharge waste heat to the environment.

One method for transferring heat between the adsorbents 122 of the system 100 is to use a heat exchange fluid that is separate from the process gas. For example, FIG. 5 illustrates a method 194 for handling a process gas and a heat exchange fluid via flow paths that are in thermal communication with each other, but are not in fluid communication with each other. In a particular embodiment, the method 194 can include directing a process gas stream along a process flow path through the first adsorbent while directing a heat exchange fluid along a heat exchanger flow path to exchange heat between the second adsorbent and the third adsorbent, with the heat exchanger flow path and the process gas flow path being in fluid isolation from each other (method portion 195). In method portion 196, process gas is directed along the process gas flow path through the third adsorbent while the heat exchange fluid is directed along the heat exchanger flow path to exchange heat between the first and second adsorbents. In method portion 197, the process gas is directed along the process gas flow path through the second adsorbent while the heat exchange fluid is directed along the heat exchanger flow path to exchange heat between the first and third adsorbents. Further details of an embodiment of this arrangement are described below with reference to a representative pair of vessels shown in FIG. 6.

Figure 6:
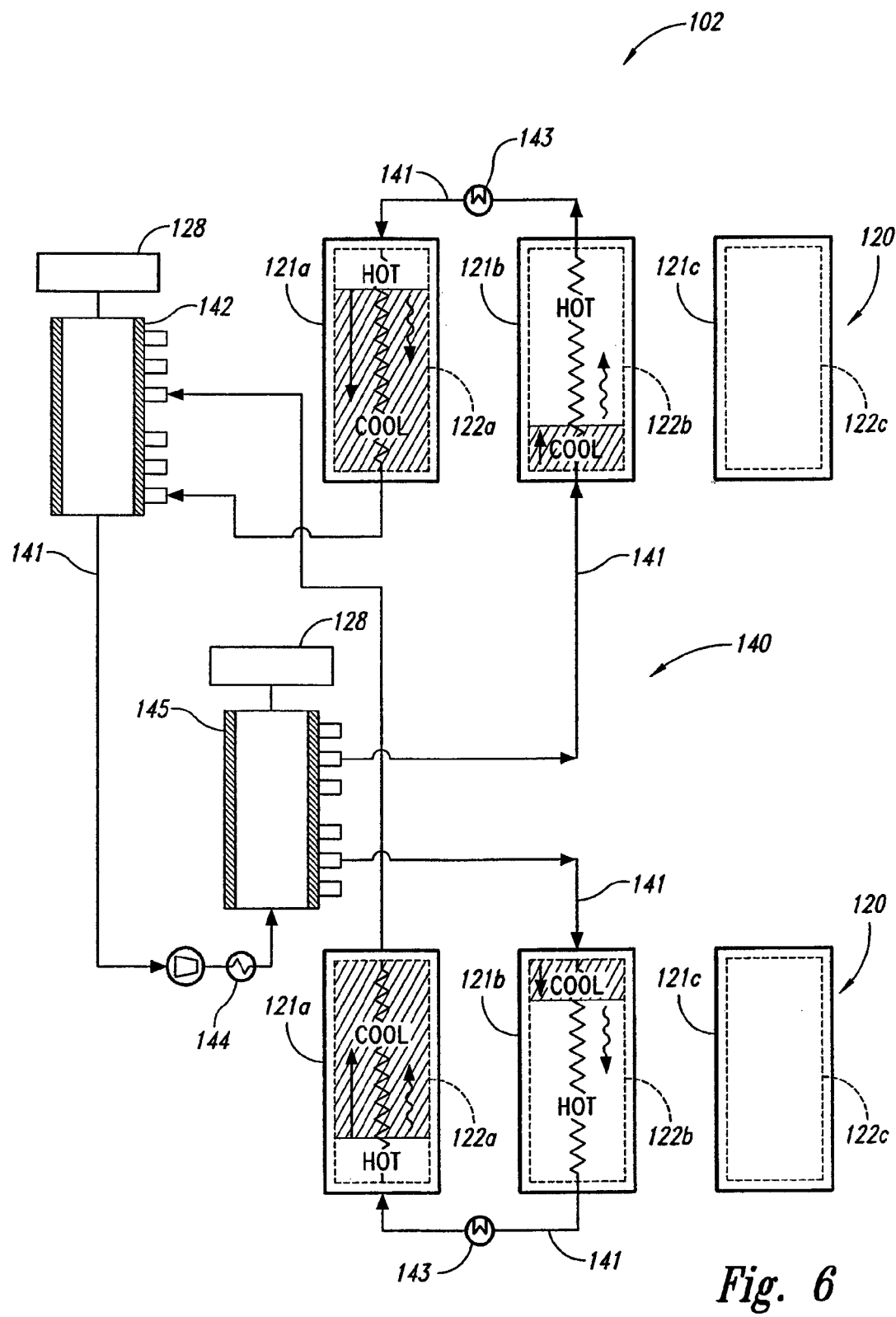
FIG. 6 is a schematic illustration of an arrangement for exchanging heat between adsorbents in accordance with an embodiment of the invention.

FIG. 6 illustrates a heat exchanger system 140 that is incorporated into the bulk purifier 102, in accordance with a particular embodiment. For purposes of illustration, certain aspects of the bulk purifier 102 described above, including the process gas flow path, are not shown in FIG. 6. The heat exchanger system 140 can include a heat exchanger inlet valve 142 driven by an actuator (such as a motor 128) and configured to receive multiple streams of heat exchange fluid and direct the streams along a heat exchanger flow path 141. A heat exchanger outlet valve 145, also driven by an actuator (such as a motor 128), directs the heat exchange fluid into selected vessels. For purposes of illustration, only connections to the first and second vessels 121a, 121b of both vessel sets 120 are shown in FIG. 6.

The heat exchanger system 140 can also include auxiliary heating heat exchangers 143 and an auxiliary cooling heat exchanger 144, which can be coupled into the heat exchanger flow path 141 to supplement the heating and/or cooling effects provided by the first and second adsorbents 122a, 122b. For example, the heat exchangers 143, 144 can make up for losses in heat transfer (discussed above) as thermal energy is repeatedly moved from one adsorbent to another. Depending on temperature and rate requirements, the auxiliary heating heat exchangers 143 can use heat rejected by other components in the system 100 shown in FIG. 1, e.g., the prepurifier 101, the power source 105, and/or the refrigerator 106. In other embodiments, heat for the auxiliary heating heat exchanger 143 can be obtained from other sources.

For purposes of illustration, cool adsorbent is shown in FIG. 6 with cross-hatching, and hot adsorbent is shown without cross-hatching. Thermal waves proceeding through each vessel 121 are shown schematically with wavy arrows. In the arrangement shown in FIG. 6, the first adsorbent 122a is being heated and purged, while the second adsorbent 122b is being cooled, corresponding to the process described above with reference to FIG. 4C. Accordingly, heat exchange fluid is directed along the heat exchanger flow path 141 from the second vessel 121b and into the first vessel 121a, optionally, supplemented with heat provided by the auxiliary heating heat exchanger 143. As the hot heat exchange fluid from the second adsorbent 122b passes through the first vessel 121a, it will be cooled by the first adsorbent 122a, the adsorbed contaminants, and the heat of desorption until the entire vessel 121a is hot and purged. Until the entire vessel 121a is heated, the cool heat exchange fluid leaving the first vessel 121a will be collected by the heat exchanger inlet valve 142 and directed by the heat exchanger outlet valve 145 to the second vessel 121b where the heat exchange fluid cools the second adsorbent 122b. The heat exchange fluid will be heated by the hot second adsorbent 122b and leave the second vessel 121b in a hot state until the entire second vessel 121b is cooled. In particular cases, the heating and cooling process may be asymmetric. In such cases, near the end of the heat transfer process between the first and second vessels 121a and 121b, the auxiliary heating heat exchanger 143 may be used to add heat to the heat exchange fluid so it enters the first vessel 121a in a hot state. Correspondingly, near the end of the heat process transfer between the first and second vessels 121a and 121b, the auxiliary cooling heat exchanger 144 may be used to cool the heat exchange fluid leaving the first vessel 121a so it enters the second vessel 121b in a cool state. The foregoing process can be duplicated for each pair of adsorbents, depending on the phase of the cycle. For example, when the first adsorbent 122a is removing contaminants from the process gas, the heat exchange fluid is directed between the second adsorbent 122b and the third adsorbent 122c. When the second adsorbent 122b is removing contaminants, the heat exchange fluid is directed between the first adsorbent 122a and the third adsorbent 122c.

The flow rates of process gas and heat exchange fluid can be selected so that each adsorbent 122 completes its process at approximately the same time. The heat exchangers 143, 144 can provide another avenue by which to trim the relative rates at which processes performed by each of the adsorbents 122 are completed. If the processes are not completed exactly in synchrony, the controller 107 (FIG. 1) can detect this event and can accordingly delay shifting the heat exchange fluid distribution or process gas distribution until all the adsorbents 122 are ready.

The heat exchange fluid can include any suitable substance having a high enough heat capacity to provide the desired level of heat transfer. For example, the heat exchange fluid can include helium or a helium/neon mixture, at elevated pressure (e.g., 800-1000 psia). In at least some embodiments, the heat exchange fluid can undergo a phase change as it is heated and cooled during thermal contact with the adsorbent 122 in the vessels 121. Such a two-phase heat exchange operation, though not required, can increase the overall efficiency of the system.

Figure 7:
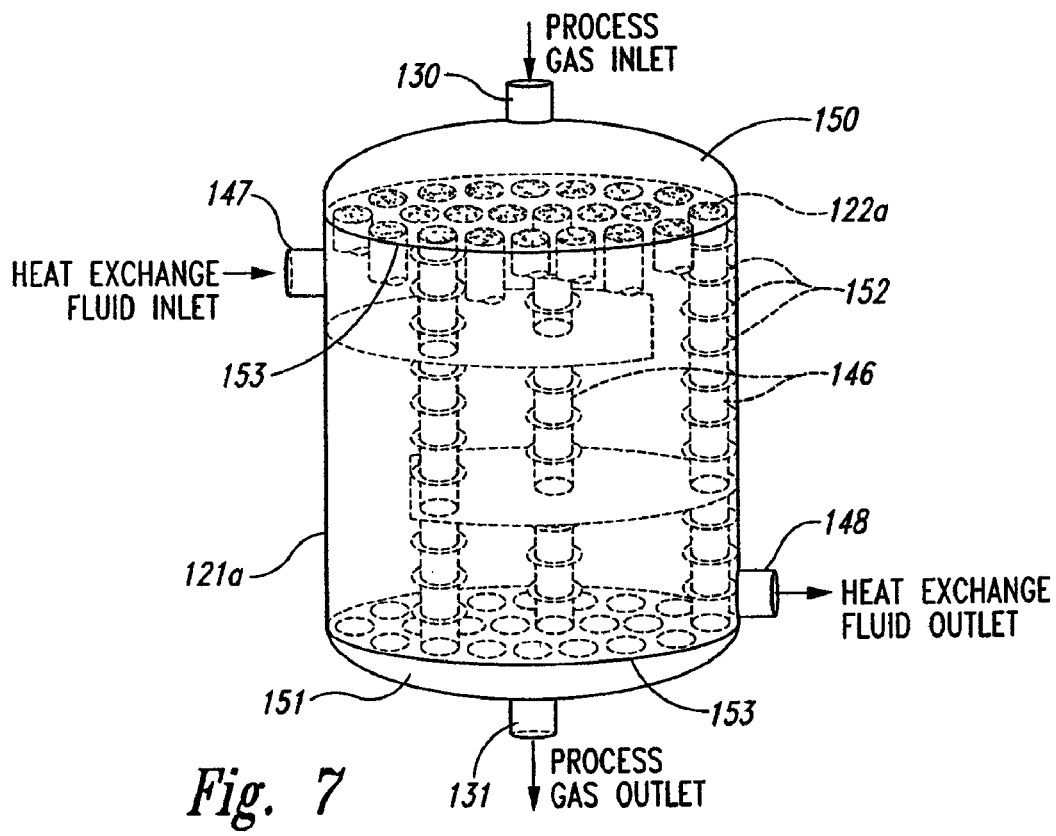
FIG. 7 is a partially schematic illustration of a vessel having an adsorbent and a heat exchanger arrangement in accordance with an embodiment of the invention.
Figure 8:
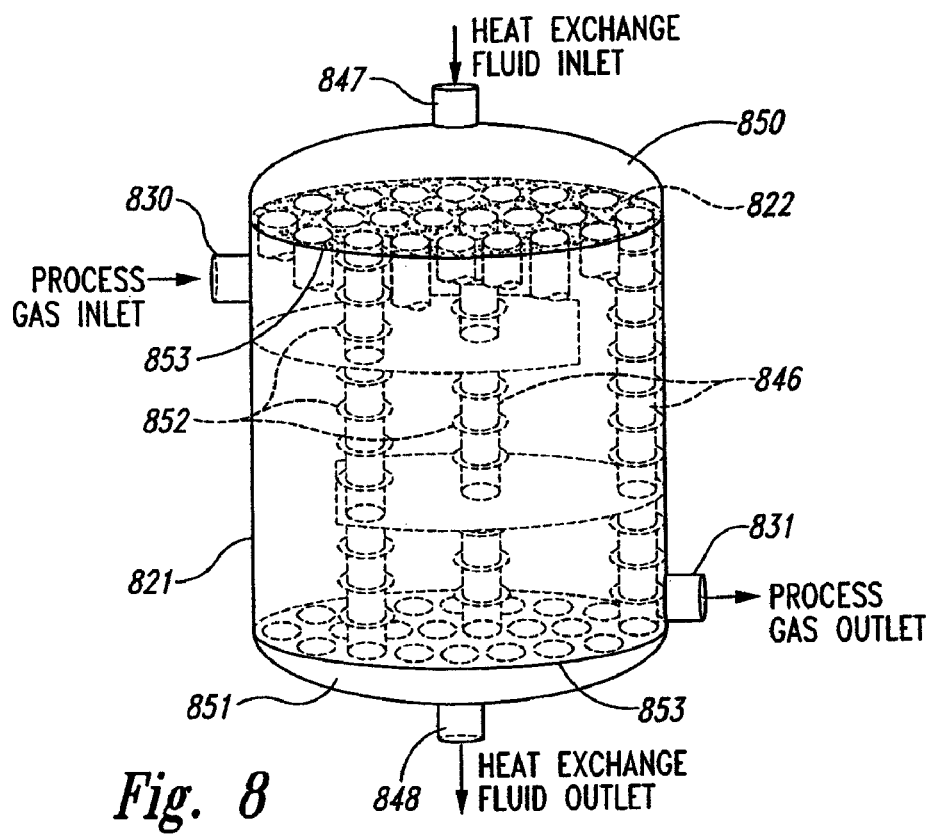
FIG. 8 is a partially schematic illustration of a vessel having an adsorbent and a heat exchanger arrangement in accordance with another embodiment of the invention.

In several of the embodiments described above with reference to FIGS. 5 and 6, the heat exchange fluid can have close thermal contact with the adsorbent 122 in the vessels 121, but does not have physical contact with the adsorbent 122, or with the process gas. FIGS. 7 and 8 illustrate representative embodiments of vessels that include heat exchangers having these characteristics. Beginning with FIG. 7, the first vessel 121a includes a process gas inlet 130 that directs the process gas into an inlet manifold 150, and a process gas outlet 131 that receives gas from an outlet manifold 151. The first adsorbent 122a is packaged in open-ended tubes or conduits 146 that are positioned between the inlet manifold 150 and the outlet manifold 151. The tubes 146 can include molecular sieves, through which the process gas stream flows. For purposes of illustration, a limited number of tubes 146 are shown schematically in FIG. 7. In an actual installation, the tubes 146 may be much more numerous, more closely spaced (in a lateral direction) and of a much smaller diameter relative to the diameter of the first vessel 121a to enhance the heat transfer rate to and from the first adsorbent 122a. Opposing end caps 153 (which bound the inlet manifold 150 and the outlet manifold 151) and the walls of the tubes 146 isolate the first adsorbent 122a so that it contacts only the process gas passing from the inlet manifold 150 to the outlet manifold 151.

The first vessel 121a can also include a heat exchange fluid inlet 147 and a heat exchange fluid outlet 148. Heat exchange fluid is directed into the vessel 121a via the heat exchange fluid inlet 147 and passes along a circuitous path among the tubes 146 between the end caps 153 and to the heat exchange fluid outlet 148. Accordingly, heat is conducted from the heat exchange fluid to the tubes 146 and the adsorbent 122a (or vice versa), without allowing the heat exchange fluid to come into direct contact with the adsorbent 122a or the process gas.

The first vessel 121a can include provisions for enhancing the thermal contact area between the heat exchange fluid and the first adsorbent 122a. Zeolite is generally a poor thermal conductor, and accordingly, such provisions can significantly improve heat transfer efficiency. For example, the tubes 146 can include external fins 152 that provide for increased surface area contact with the heat exchange fluid. The tubes 146 can also include internal fins or pins that provide for increased surface area contact with the first adsorbent 122a. The tubes can be thermally well connected with many layers of fine mesh metal screens that provide excellent radial heat exchange between the tubes containing the adsorbent and the separate heat transfer fluid. In this manner, the efficiency with which the heat exchange fluid transfers heat from one vessel to another can be very high, which reduces the amount of time required to transfer heat between adsorbents, and reduces the opportunities for heat loss as a result of the transfer. In a particular embodiment, the temperature of the heat exchange fluid exiting a hot vessel (e.g., a vessel at 500° F.) can increase to within a few degrees of 500° F. in nearly a step manner once it begins flowing through the vessel, and can maintain a temperature of about 500° F. for 95-98% of the time that it is flowing from that vessel, with assistance from the auxiliary hot heat exchanger 143 only during the final few percent of its flow period (FIG. 5).

FIG. 8 schematically illustrates a vessel 821 having a heat exchanger arrangement in accordance with another embodiment. In this embodiment, the flow paths of the process gas and heat exchange fluid are generally opposite from the arrangement shown in FIG. 7. Accordingly, an inlet manifold 850 receives heat exchange fluid from a heat exchange fluid inlet 847, and an outlet manifold 851 collects the heat exchange fluid for delivery to a heat exchange fluid outlet 848. Tubes 846 direct the heat exchange fluid between the inlet manifold 850 and the outlet manifold 851. An adsorbent 822 is packed in the interstices between neighboring tubes 846. High conductivity screens 852 that are thermally well connected among the tubes 846 can provide excellent thermal contact between the heat exchange fluid within the tubes 846 and the adsorbent 822 outside the tubes 846. The process gas is delivered to the adsorbent 822 via a process gas inlet 830 and passes out of the vessel 821 through a process gas outlet 831. End caps 853 contain the process gas to the region between the inlet manifold 850 and the outlet manifold 851.

In other embodiments, the system can include other heat exchanger arrangements for transferring heat from one adsorbent to another. For example, the system can include other heat exchangers having a shell and tube configuration, or heat exchangers having configurations other than shell and tube. The heat exchangers can be parallel flow or cross-flow heat exchangers and can include any of a myriad of features that enhance heat transfer, including, but not limited to, screens, fins, projections, baffles, convoluted tubes, pins, etc.

One feature of many of the foregoing embodiments, as discussed above, is that they include rapidly transferring heat among volumes of adsorbent to heat and purge the adsorbent and cool the adsorbent prior to re-exposing the adsorbent to a process gas. This arrangement is expected to significantly increase the overall capacity to remove contaminants of a given amount of adsorbent and to increase the thermal efficiency of the module. Rapid temperature swing adsorption modules generally also have much less loss of methane when compared to rapid pressure swing adsorption or continuous membrane bulk purification methods. For example, at least some embodiments are expected to achieve up to 98-99% methane retention efficiency, as compared with pressure swing adsorber systems, which typically achieve methane retention efficiencies of 75-90% or less. One advantage of this arrangement is that it can reduce the cost of purifying a process gas with high concentrations of contaminants generally (such as carbon dioxide) to levels required for production of LNG. In particular, it can reduce the cost by a significant enough margin to allow economical operation at relatively small throughput values. In particular embodiments, such modules can operate at rates of less than 1 MMscfd. This in turn is expected to allow the module to utilize process gas feedstock that is much more widely distributed than the feedstocks used for existing technology. For example, embodiments of the foregoing systems are expected to have applications for removing carbon dioxide from methane obtained from farms, solid waste dumps, landfills, smaller refineries and gas fields, and municipal sewage treatment plants, among others.

Another advantage of the foregoing feature is that it can enable economical methane purification from feedstocks that may be relatively highly contaminated. For example, most conventional or slow temperature swing adsorption module arrangements require a feedstock that contains 2% or less carbon dioxide. However, rapid temperature swing adsorption modules in accordance with particular embodiments discussed above can effectively process input gas streams containing 10-15% carbon dioxide (molar concentration), and in further embodiments, up to 35% carbon dioxide.

Another feature of several embodiments of the foregoing modules and methods is a heat exchange fluid path that is in thermal communication with the adsorbent, but is isolated from direct fluid communication with the adsorbent and the process gas stream. An advantage of this arrangement is that it allows a variety of heat exchange fluids to be used to transfer heat to and from the adsorbent, without requiring that the heat exchange fluid be chemically compatible with the adsorbent, or with the process gas that is subsequently directed into the adsorbent. As a result, heat exchange fluids having improved heat transfer characteristics can be used in the module without interfering with the adsorbent or the process gas.

Yet another feature of at least some of the foregoing embodiments is that they can rapidly transfer heat between adsorbents and corresponding vessels. For example, in some embodiments, two sets of three adsorbent-containing vessels can be fit within the boundary of a typical ISO container (8 ft.×9.5 ft.×40 ft.), and each vessel can undergo each of the foregoing three process phases in about an hour or less, and in a particular embodiment, about 20 minutes or less. This is unlike existing temperature swing adsorption processes, which typically require tens of hours to purge.

Still another feature of at least some of the foregoing embodiments is the use of multi-port rotary valves to direct fluid (e.g., process gas or heat exchange fluid) among the multiple available flow paths. An advantage of this arrangement is that it can result in a convenient and quick way to redirect both the process gas stream and the heat exchange fluid. As a result, the flow of process gas can continue at least approximately uninterrupted as the flow of process gas is shifted from one adsorbent to another, and the flow of heat exchange fluid can also remain at least approximately uninterrupted as it is shifted from one adsorbent to another.

From the foregoing, it will be appreciated that specific, representative embodiments of the invention have been described herein for purposes of illustration, but that various modifications may be made without deviating from the invention. For example, the vessels and adsorbents contained within the vessels can have characteristics other than those specifically described above. The heat exchangers can also have features other than those described above and shown in the Figures. While the overall process was described in the context of removing carbon dioxide from methane, many aspects of the foregoing systems and processes may be used in conjunction with systems that remove other constituents from methane, or remove any of a wide variety of constituents from gases other than methane. Other constituents can include oxygen, water, hydrogen sulfide and/or nitrogen. While not expressly identified in the Figures, the controller can be coupled to a wide variety of sensors to automatically detect the characteristics of the adsorbent, the process gas, the heat transfer fluid, and/or other system components and can automatically control and/or adjust the aspects of the process in accordance with information received from the sensors.

Certain aspects of the invention described in the context of particular embodiments may be combined or eliminated in other embodiments. For example, while transferring heat between adsorbents using a heat exchange fluid that is isolated from fluid communication with the adsorbent and the process gas is expected to produce enhanced results, in other embodiments, other techniques for transferring heat between adsorbents may be used. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited except as by the appended claims.

We claim:

1. A gas processing system, comprising:
   first, second and third adsorbents, each configured to remove a constituent from a flow of process gas;
   a valve system having at least one valve coupled among the first, second and third adsorbents; and
   a controller operatively coupled to the valve system, the controller being programmed with instructions that, when executed, direct an exchange of heat between two of the adsorbents while a remaining adsorbent receives the flow of process gas.

2. The system of claim 1, further comprising:
   a process gas flow path having individual portions passing through the individual adsorbents; and
   a heat exchanger flow path coupled among the three adsorbents, the heat exchanger flow path including individual portions passing through the individual adsorbents, the heat exchanger flow path and the process gas flow path being in fluid isolation from each other.

3. The system of claim 2 wherein the valve system includes at least one first valve in the process gas flow path and at least one second valve in the heat exchanger flow path, and wherein the controller is operatively coupled to the first and second valves, the controller being programmed with instructions that, when executed, direct an exchange of heat between two of the adsorbents via the heat exchanger flow path while a remaining adsorbent receives process gas via the process gas flow path.

4. The system of claim 1 wherein each of the first, second and third adsorbents is housed in an individual vessel.

5. The system of claim wherein 1 the first, second and third adsorbents are housed in a rotatable vessel, the rotatable vessel being rotatable among at least three positions to expose each of the adsorbents to the flow of gas.

6. A gas processing system, comprising:
   first, second and third adsorbents, each configured to remove a constituent from a flow of process gas;
   a process gas flow path having individual portions passing through the first, second and third adsorbents; and
   a heat exchanger flow path coupled among the three adsorbents, the heat exchanger flow path including individual portions passing through the first, second and third adsorbents, the heat exchanger flow path and the process gas flow path being in fluid isolation from each other, at least a portion of the heat exchanger flow path forming a closed loop between two of the adsorbents.

7. The system of claim 6, further comprising:
   a first valve device operatively coupled among the portions of the process gas flow path;
   a second valve device operatively coupled among the portions of the heat exchanger flow path; and
   a controller operatively coupled to the first and second valve devices.

8. The system of claim 7 wherein the controller is programmed with instructions directing a flow of heat exchange fluid along the heat exchanger flow path between the two adsorbents while process gas is directed through a remaining adsorbent and not through the two adsorbents.

9. The system of claim 6, further comprising:
   a first vessel housing the first adsorbent;
   a second vessel housing the second adsorbent; and
   a third vessel housing the third adsorbent, wherein each of the three vessels is individually coupleable to the process gas flow path.

10. The system of claim 6, further comprising:

a vessel having a process flow inlet and a process flow outlet, and wherein:

the first adsorbent is positioned in the vessel;

the process flow gas path is in direct contact with the adsorbent; and wherein the heat exchanger flow path includes a heat exchanger conduit located within the vessel and in thermal communication with the first adsorbent.

11. The system of claim 10 wherein the heat exchanger conduit includes the first adsorbent, and wherein the process flow gas path passes within the heat exchanger conduit and the heat exchanger flow path passes outside the conduit.

12. The system of claim 10 wherein the first adsorbent is positioned external to the heat exchanger conduit, and wherein the process flow gas path passes outside the heat exchanger conduit and the heat exchanger flow path passes within the conduit.

13. The system of claim 10 wherein the first adsorbent is configured to adsorb carbon dioxide from a stream of process gas that includes carbon dioxide and methane.

14. A gas processing system, comprising:

first, second and third adsorbents, each configured to remove a constituent from a flow of process gas;

a process gas flow path having individual portions passing through the first, second and third adsorbents;

a heat exchanger flow path coupled among the three adsorbents, the heat exchanger flow path including individual portions passing through the first, second and third adsorbents; and a valve coupled to the heat exchanger flow path, the valve having multiple ports with individual ports being selectively coupleable to the individual portions of the heat exchanger flow path to form a closed loop of the heat exchanger flow path between any two of the adsorbents.

15. The system of claim 14 wherein the valve is a first valve, and wherein the system further comprises a second valve coupled to the process flow gas path.

16. The system of claim 14 wherein the valve is a first rotary valve and wherein the system further comprises:

a second rotary valve coupled to the process flow gas path upstream of the first, second and third adsorbents to distribute process gas among the first second and third adsorbents; and a third rotary valve coupled to the process gas flow path downstream of the first, second and third adsorbents to collect process gas from the first, second and third adsorbents.

17. The system of claim 14, further comprising a heat source coupled to the heat exchanger flow path to supplement heat provided by the adsorbents.

18. The system of claim 14, further comprising a cooler coupled to the heat exchanger flow path to supplement cooling provided by the adsorbents.

19. The system of claim 14, further comprising a controller operatively coupled to the valve and programmed with instructions that, when executed, direct a flow of heat exchange fluid along the heat exchanger flow path between the two adsorbents while process gas is directed through a remaining adsorbent and not through the two adsorbents.

20. A gas processing system, comprising:

first, second and third adsorbents, each configured to remove a constituent from a flow of process gas;

a process gas flow path having individual portions passing through the first, second and third adsorbents;

a heat exchanger flow path coupled among the three adsorbents, the heat exchanger flow path including individual portions passing through the first, second and third adsorbents, the heat exchanger flow path and the process gas flow path being in fluid isolation from each other;

a first valve device operatively coupled among the portions of the process gas flow path;

a second valve device operatively coupled among the portions of the heat exchanger flow path; and a controller operatively coupled to the first and second valve devices and programmed with instructions that, when executed, direct a flow of heat exchange fluid along the heat exchanger flow path between two of the adsorbents while process gas is directed through a remaining adsorbent and not through the two adsorbents.

* * * * *